United States Patent [19]

Kedem et al.

[11] 4,033,850

[45] July 5, 1977

[54] ELECTRODIALYSIS DEVICE

[75] Inventors: Ora Kedem; Abraham Kedem, both of Rehovot, Israel

[73] Assignee: Yeda Research & Development Co. Ltd., Rehovot, Israel

[22] Filed: Nov. 17, 1975

[21] Appl. No.: 632,801

[30] Foreign Application Priority Data

Nov. 29, 1974 Switzerland .................. 15888/74

[52] U.S. Cl. .......................... 204/301; 204/180 P
[51] Int. Cl.² .................................... B01D 13/02
[58] Field of Search ............. 204/180 P, 301, 152

[56] References Cited

UNITED STATES PATENTS

| | | | |
|---|---|---|---|
| 3,219,567 | 11/1965 | Lacey | 204/180 P |
| 3,291,713 | 12/1966 | Parsi | 204/301 X |
| 3,496,091 | 2/1970 | McGriff et al. | 204/301 |
| 3,645,884 | 2/1972 | Gilliland | 204/301 |
| 3,896,015 | 7/1975 | McRae | 204/180 P |

*Primary Examiner*—Arthur C. Prescott
*Attorney, Agent, or Firm*—Browdy and Neimark

[57] ABSTRACT

An electrodialysis device comprising a plurality of adjacent compartments through which there flow dialysate and brine, respectively, each dialysate compartment being separated from the adjoining two brine compartments by an anion-selective and by a cation-selective membrane, respectively, the two terminal compartments being connected to an anode and to a cathode of a current source, wherein in the space between the membranes there is provided a continuous anion conductive element and a continuous cation conductive element, in contact with each other, each of these consisting of a different kind of ion-exchange material, the anion selective material being in contact with the anion-selective membrane, the cation selective exchange material being in contact with the cation selective membrane, the electric resistance of said elements being lower than that of the dialysate, said elements providing a path for the different ions across a larger part of the distance between the membranes.

12 Claims, 11 Drawing Figures

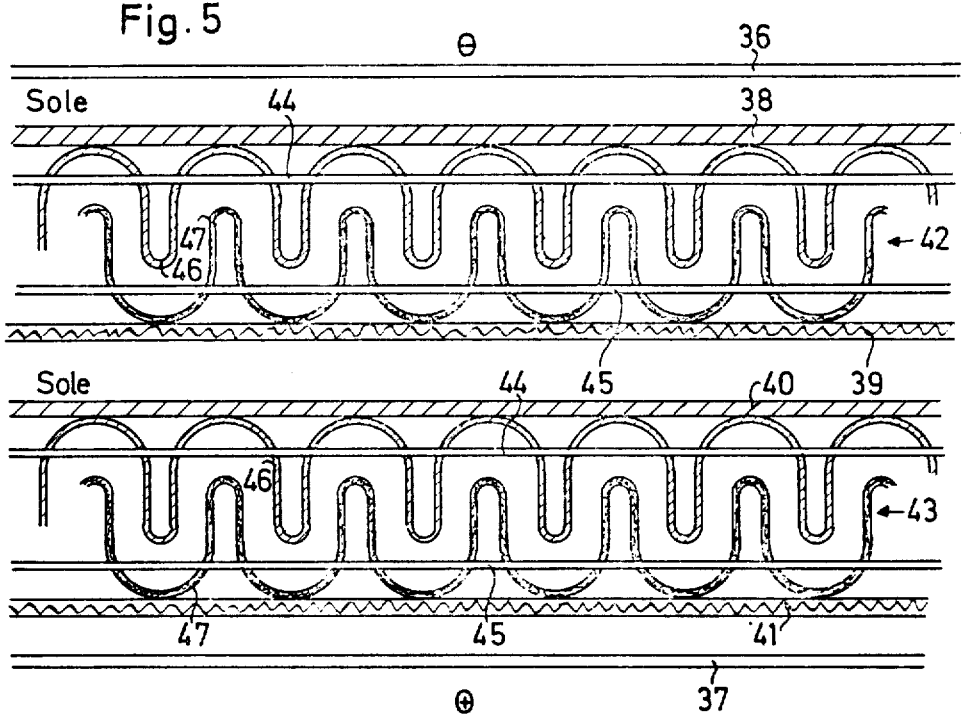
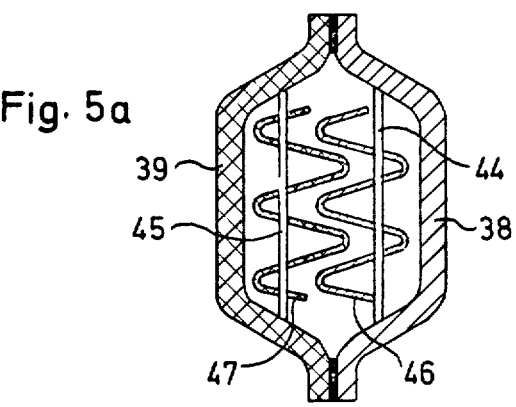
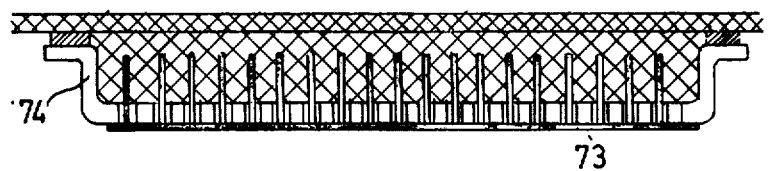

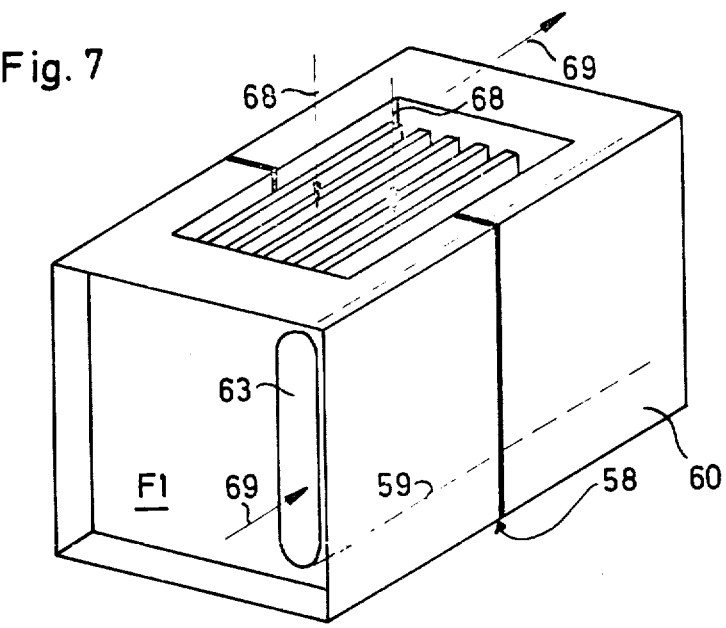
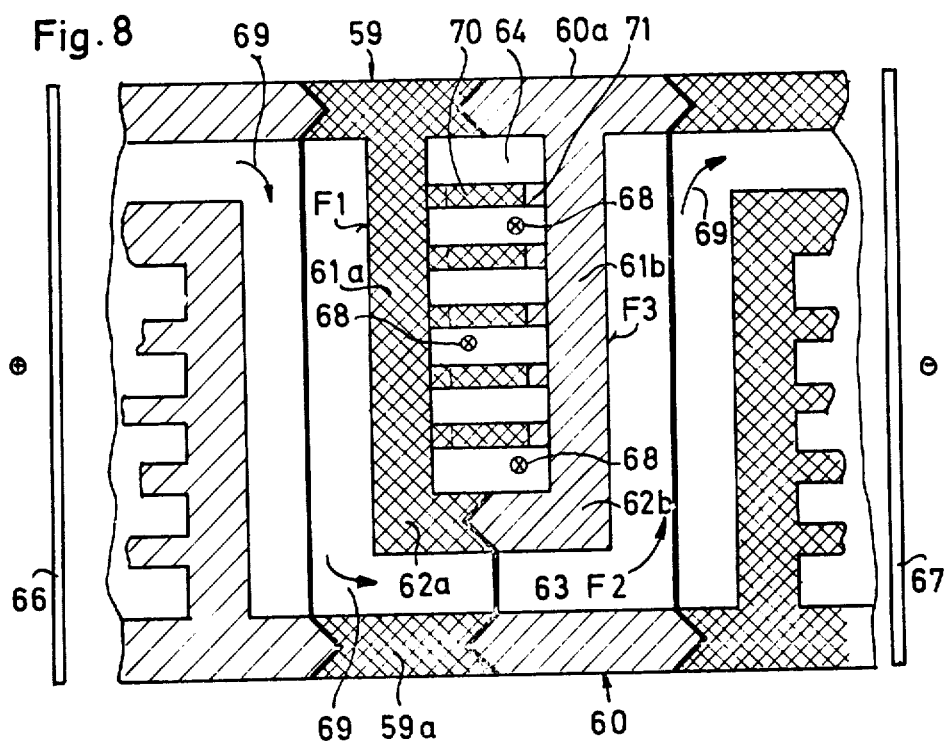

ELECTRODIALYSIS DEVICE

STATE OF THE ART

In conventional electrodialysis stacks there is provided a plurality of adjacent solution compartments, with alternating dialysate and brine compartments, separated by a cation exchange membrane from one adjacent compartment and by an anion exchange membrane from the second adjacent compartment, electrodes which are connected to a suitable current source being provided in the terminal compartments. The passage of a direct current through the dialysis stack results in depletion and enrichment, respectively of salt in adjacent compartments. The rate of desalination is roughly proportional to the electric current. An increase of the current density, i.e. of current per unit area of membrane, leads to an increased rate of desalination, but there exists an upper limit of useful current density due to polarization. This phenomenon appears especially in the dialysate. Polarization is a local change of concentration, resulting from ion-transport phenomena, bringing about a high ohmic resistance caused by depletion of salt concentration of the solution in the immediate vicinity of the membranes and by not too clear changes in the membranes themselves. Theoretically the limiting current is reached when the ion concentration in the solution close to the membrane surface approaches zero. This does not happen in practice as hydrogen and hydroxyl ions themselves can participate in the ion transport. This process termed "water splitting" results in losses of current efficiency. The upper practical limit of effective current is that at which "water splitting" commences. There are also induced changes of pH which promote precipitation of various substances on the membrane surfaces, an effect termed "scaling" or "fouling", causing membrane damage.

It is known that current efficiency can be increased by generating eddies in the liquid, resulting in a faster rate of diffusion of salt ions towards the membrane surfaces, replacing the removed ions. As many eddies as possible are generated and thus polarization can be decreased but it cannot be eliminated. It is clear that polarization phenomena are very much dependent on the dynamic conditions of flow.

Attempts have been made to decrease polarization by the application of brief pulses of current in a direction opposite to that of the desalinating current. This too does not eliminate polarization.

Conventional electrodialysis stacks suffer from additional drawbacks. Stacks consisting of hundreds of membranes must be dismantled even if a single membrane fails, and such membrane damage cannot be entirely avoided.

In British Pat. Nos. 796,149; 858,076 and 939,690 means are described for decreasing the ohmic resistance of dialysate compartments by the introduction into same of granulated ion-exchange materials. If such material of one kind only is used, strong polarization effects occur at the contact areas between cation exchange resin and anion-selective membrane and vice versa. If a mixed granulate is used no unbroken paths for cations in the cation-exchange resin and of anions in the anion exchange resin are provided. Such granulates complicate the construction of stacks and increase the lateral size. According to yet another suggestion a spacer is provided comprising elongated cation exchange and elongated anion exchange particles formed to provide a porous body by means of an inert resin. Polarization is not prevented as no continuous path is provided for either kind of ions.

BRIEF SUMMARY OF THE INVENTION

The present invention relates to a novel electrodialysis device comprising a plurality of adjacent compartments through which there flow dialysate and brine, respectively, each dialysate compartment being separated from the adjoining two brine compartments by an anion-selective and by a cation-selective membrane, respectively, the two terminal compartments being provided with an anode and a cathode connected to a suitable current source, wherein in the space between the membranes there are provided two continuous ion-conductive elements in contact with each other, said elements consisting of two different kinds of ion exchange material, the anion-selective material being in contact with the anion-selective membrane, the cation-exchange material being in contact with the cation selective membrane, the electric resistance of said elements being lower than the resistance of the dialysate, said elements providing a path for the different ions across a larger part of the distance between the membranes.

According to a preferred embodiment of the invention, the said elements are at least partially interdigiting or interwoven. Said elements may consist of a fabric comprising fibers of the two different kinds of ion-exchange materials. The said elements may consist of ribbons of different ion exchange materials, which are in contact with each other. When the ion-exchange materials are in the form of fibers or the like, they may be supported by a suitable inert permeable support member.

The term "continuous ion-conductive element" designates an element comprising a cation-exchange material and an anion-exchange material, said element being positioned in the space between the two different membranes of the electrodialysis stack, said elements being in conductive contact with the respective membranes, thus providing an unbroken path for the ions for which each of these materials are selective. Following conventional terminology, anion-exchange membrane and anion selective membrane are synonyms; this applies of course also the cation-exchange membranes and cation selective membranes.

The said ion-conductive elements may form an integral part of the respective membranes, and constitute of members protruding into the space between the two different membranes of the said compartment of the stack. As stated above, the said elements may be made from ribbons, fibers, threads, fabrics or the like of suitable ion-exchange materials. According to a preferred embodiment these are interwoven or interconnected in any other suitable form, each of the ion-exchange materials being in conductive contact with the respective membrane. It has surprisingly been found that the cation-selective part of the said element can be in contact also with the anion-selective membrane and vice versa, without causing any undesired effects.

The novel ion-conductive elements provided according to the present invention provide comparatively large surface areas, and these substantially decrease polarization effects. Furthermore, they substantially increase turbulence in the compartments, and this especially at the critical interface of ion-exchange material and solution.

Local "water splitting" refers to the entrance of protons and hydroxyl ions into cation or anion exchange elements, respectively. Local water splitting may occur at the areas of contact between the different elements, but in view of the comparatively small cross-section of the ion-conductive elements relative to their length, makes possible a re-exchange process for other ions in the dialysate compartment, avoiding to a large extent the negative effects of water splitting.

When a woven or knit fabric or the like is used, it is advantageous that a substantial part of the fibers, yarn, or the like be positioned in the space in between the membranes in such manner that they extend to a large extent substantially parallel with the lines of the electric field between the anode and the cathode.

In order to be effective, the electrical resistance of the ion-conductive element must be lower than the resistance of the dialysate. The concentration of the dialysate decreases in a gradual manner from the concentration of the feed solution and up to the final concentration of the product. In an "open stack" the dialysate flows in a single conduit defined by the elements containing the brine and by the body of the stack. Desalination in an open stack without undue losses of current efficiency is possible if the average electric resistance in the dialysate compartment containing ion-conductive elements is lower than the specific resistance of the dialysate solution.

According to a specific embodiment of the present invention the one membrane is provided with a plurality of protrusions of suitable ion-exchange material, according to that of the membrane proper, the space between said membrane and its protrusions and between the opposite membrane being filled with granulated or other particulate ion exchange material of the opposite kind, allowing for the free flow of the dialysate between the free granulate, ribs and membranes.

The ion-conductive elements comprise advantageously a web or weave of yarns, filaments or fibers of two different ion-exchange materials, one anion selective, the other cation selective, the arrangement being such that the anion selective one is in contact mainly with the anion-separating membrane, the cation selective fibers with the cation selective membrane.

BRIEF DESCRIPTION OF THE DRAWINGS

FIGS. 5 and 5a illustrate the use of ion-exchange yarns, in ion conductive members of the present invention, FIG. 5b illustrates a further embodiment of the ion-conductive element, FIGS. 6/6a are simplified schematical views, in partial section, of a further embodiment illustrating an open stack, in which the brine flows in a sealed spiral-shaped conduit, and the dialysate flows in a single conduit defined by the spiral, FIGS. 7 and 8 are a schematical perspective view and top view in section of a stackable modular type open dialysis cell, comprising a plurality of standardized elements.

Figure 1:
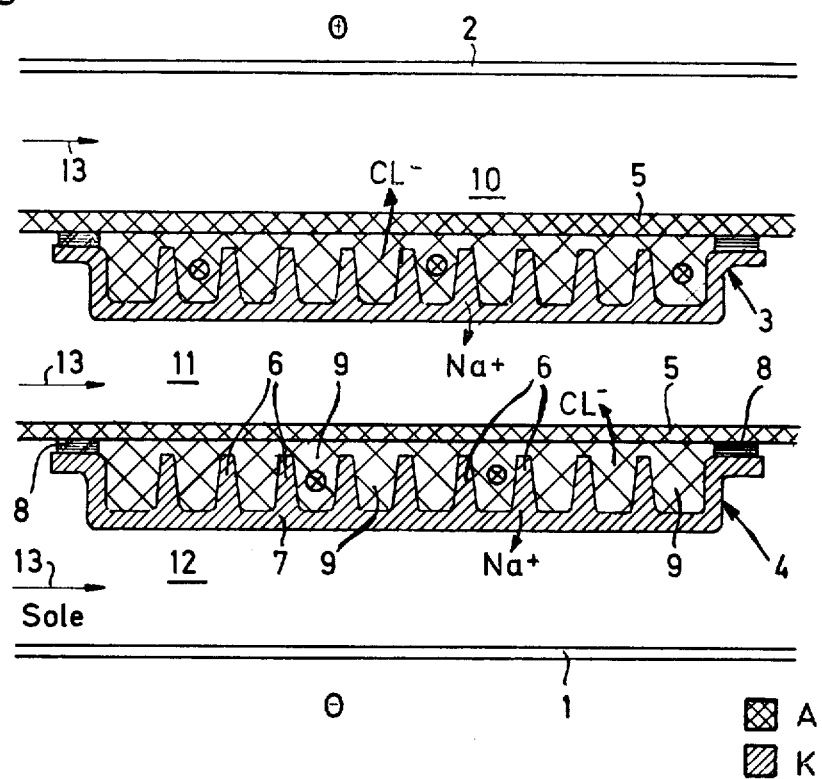
FIG. 1 is a schematic top view, in section, of an electrodialysis cell according to the invention, not according to scale.
Figure 2:
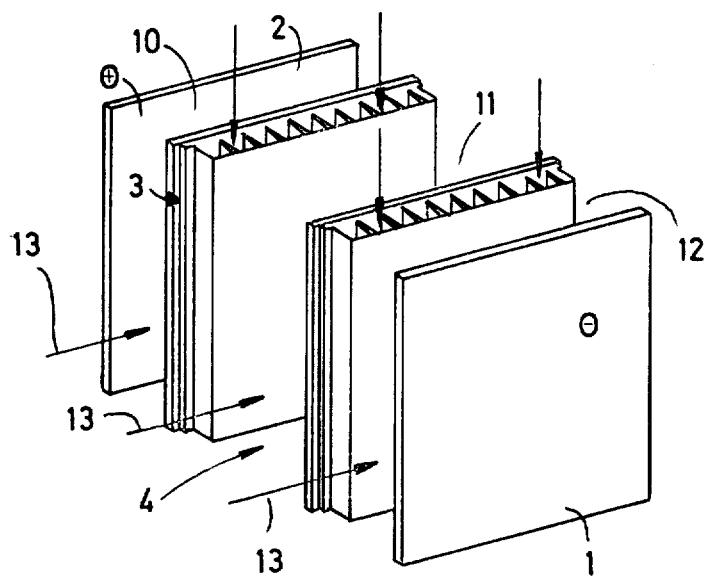
FIG. 2 is a perspective exploded view of a cell of the type shown in FIG. 1.

The electrodialysis device according to the present invention illustrated in FIGS. 1 and 2 comprises a plate-shaped cathode 1 and anode 2, between which there is established an electric field when a direct current is applied to the electrodes. In the space between the two electrodes there are provided two inserts, designated as 3 and 4, respectively. In actual use, such a dialysis device will not comprise two, but a large number of such inserts between the two electrodes. The inserts 3 and 4 are identical as regards their construction.

Each of the inserts 3 and 4 comprises an anion-selective membrane 5, and a cation 6 selective membrane 7 provided with a plurality of protrusions of the same ion-exchange material as that of the cation selective membrane. These two elements are attached to each other by means of adhesive 8. The gap between membranes 5 and 7 is filled with granulated anion-selective ion-exchange material 9, retained by a previous sieve or grid. There are formed three brine compartments 10, 11, and 12, through which the brine flows in the direction of the arrows 13, while the dialysate flows in a direction perpendicular to that of the brine through the space filled with the granulate 9. The electrical resistance of all the materials filling the dialysate compartment is lower than that of the dialysate. If the dialysate contains sodium chloride in dissolved form, the chloride anions will move via insert 3 into the brine compartment 10, while the sodium cations will move into the brine compartment 11, whereas the $Cl^-$ -anions of the insert 4 will move into the brine compartment 11 and the corresponding sodium cations will move into the brine compartment 12.

As the cation exchange material of the ribs 6 is in intimate contact with the granulate 9 in the dialysis compartment, there is provided an excellent passage for the ions. Due to this specific construction the polarization is either entirely eliminated or substantially reduced, resulting in higher current efficiency. The desalination is effected in substantially the entire space of the dialysis compartment and not only in the immediate vicinity of the membranes. The ribs increase the turbulence and this further decreases polarization. As the path of the ions in the solution to be dialyzed is decreased, and takes place to a large extent in the ion exchange material wherein said ions move, the resistance is decreased. One of the further advantages is the decreased need of maintanance. The inserts 3 and 4 can be used as elements in conventional dialysis devices between conventional membranes. The membrane 7 replaces in this case one of the existing two membranes.

Figure 3:
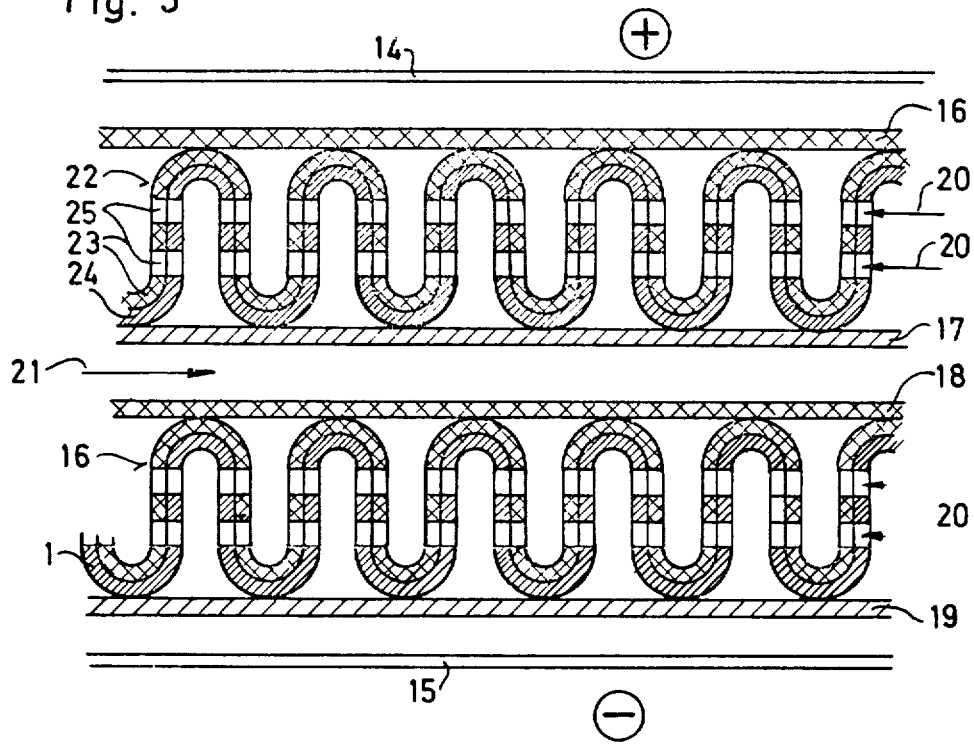
FIG. 3 is a sectional top-view of a cell according to the invention, with a meandering double-tape shaped ion-conductive element.

According to a further embodiment of the present invention, illustrated with reference to FIG. 3, in the electric field between the electrodes 14 and 15 there are positioned the four membranes 16, 17, 18 and 19. The dialysate flows through the space defined by membrane 16 and 17, and 18 and 19, respectively in the direction of arrows 20. The brine flows between membranes 17 and 18. The dialysate compartments contain spacers 22, each consisting of two strips of anion-exchange material 23 and cation-exchange material 24, which are attached to each other by an adhesive, by stiching or by any other suitable means. These are provided with holes 25 which make possible a substantially unhindered liquid flow. The anion-selective ribbons 23 are in contact with the anion selective membrane, the cation selective ribbon 24 with the cation selective membrane. The results are similar to those described with reference to the proceding Figures.

Figure 4:
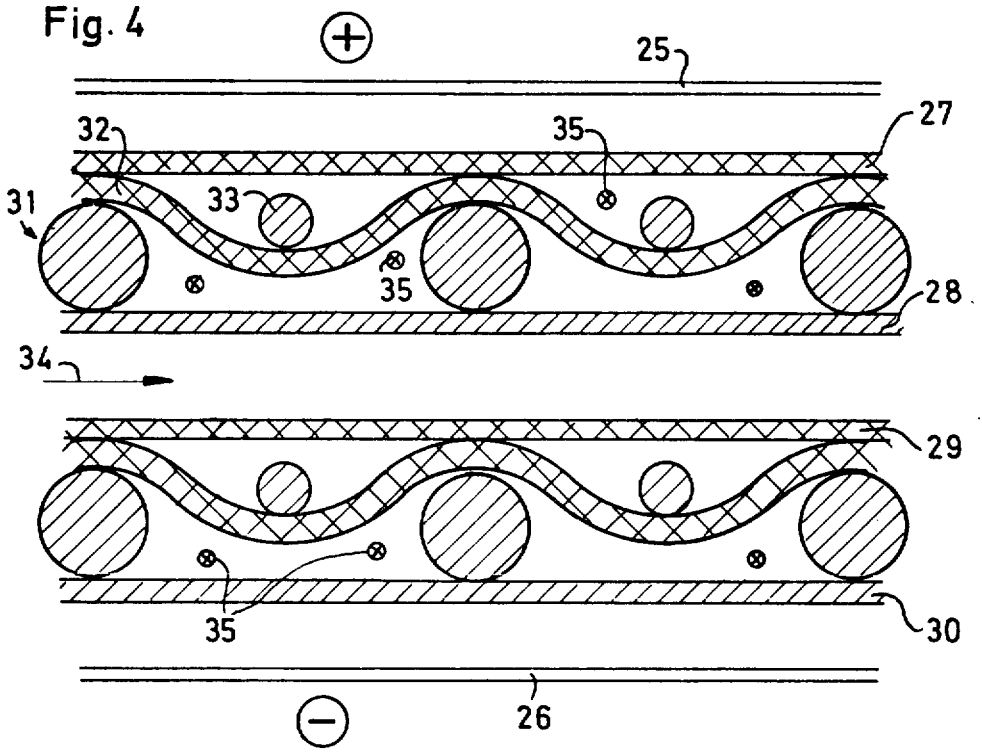
FIG. 4 is an illustration of the use of ion-exchange fabrics.

As shown in FIG. 4, there are provided between the two electrodes 25 and 26 four membranes 27, 28, 29 and 30. Between the membranes 27 and 28 and between 29 and 30 there are provided ion-conductive elements which in this case are in the form of fabrics. This fabric 31 comprises anion-exchange material threads 32 and cation-exchange material threads 33. These are interwoven and arranged in such manner that the materials are predominantly in contact with the corresponding membranes. The brine flows in the direction of arrow 34 between membranes 28 and 29, whereas the direction of flow through the dialysis compartments is in the direction of flow perpendicular thereto, as shown by 35. Such fabrics 31 can be used in conventional electrodialysis stacks. The fabric can be a knitted one or a woven one. This can be made from a double yarn consisting of two yarns of the different ion-exchange materials.

As shown in FIG. 5, a different embodiment comprises two electrodes 36 and 37, between which there are membranes 38, 39, 40 and 41. The dialysis compartments are enclosed by membranes 38, 39 and 40 and 41, respectively. The inserts are marked 42 and 43, each of which consists of a sheet or screen 44 and 45 of insert material, to which there are attached a plurality of loops of anion-exchange material 47, and loops 46 made of cation selective material. The loops overlap and are intertwined, and these provide a large surface for the transport of the ions. The ion-conductive elements 42 and 43 can be used in conventional stacks. The spacers can be in tubular form, as shown in FIG. 5a.

The embodiment shown in FIG. 5b is a plate of an inexpensive ion-exchange material 73, pressed through the perforations of an inert sheet of polymeric material, 74.

Figures 6, 6A:
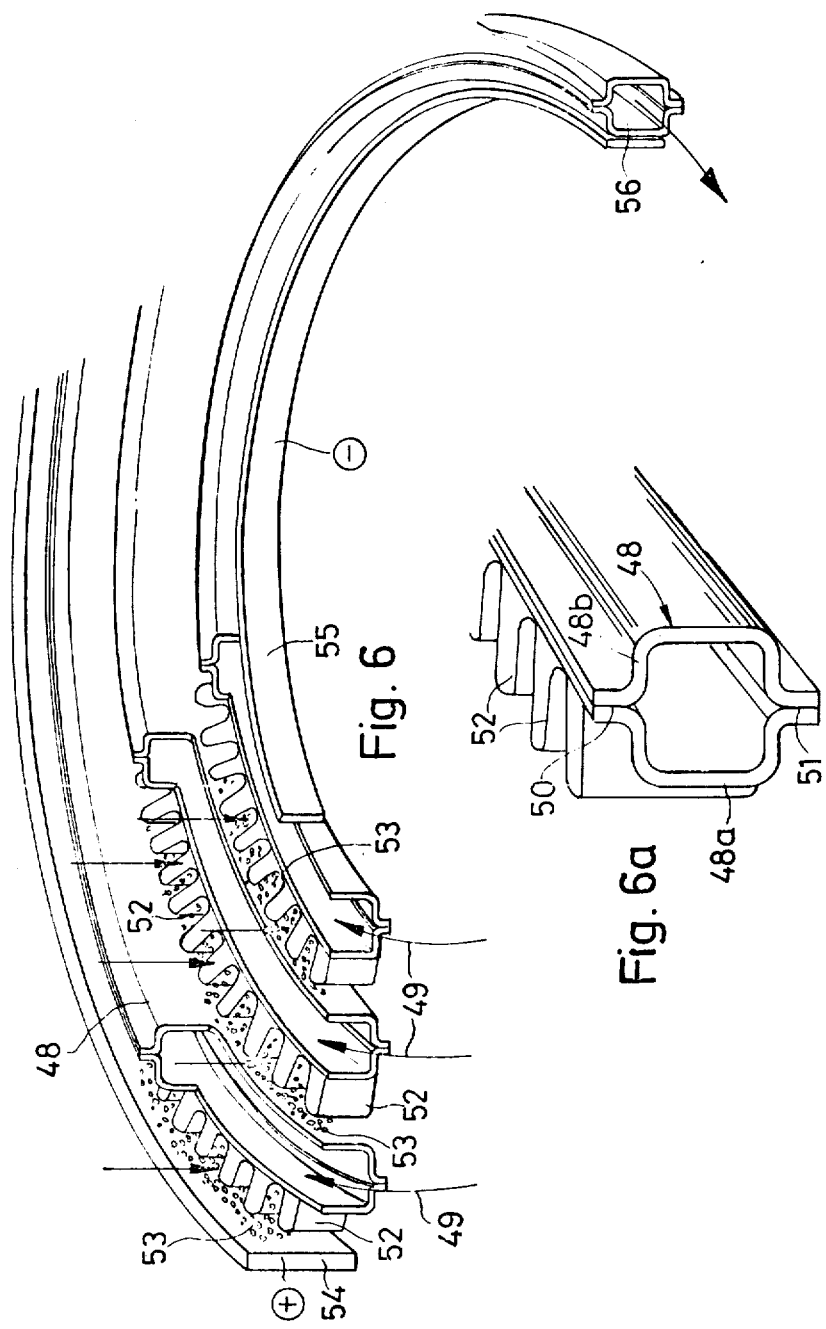

A spiral-shaped arrangement is illustrated in FIG. 6. Brine flows in the direction of arrow 49 through the spiral tube 48, made of two halves 48a and 48b, illustrated in FIG. 6a, the loops being at a predetermined distance from each other. The parts 48a are made of an anion-selective material, parts 48b of cation selective material. Into the space between the individual spiral sections there extend rib-formed members 52 which can be formed integrally with the half 48a and which have a resistance less than that of the dialysate. From the opposite side, i.e. the outer surface of the cation selective half of the tube there is provided a filling 53 of cation-selective granulated material. The tubular spiral is surrounded at the circumference by a ring shaped anode 54 and at the inner surface by a ringshaped cathode 55, connectable to a suitable current source. Brine flows through the tube while the dialysate flows across the spiral. The granulate is retained in place by a sieve or grid. As in the other embodiments, there is no need for an electrical insulation between the different ion-exchange materials. An intimate contact between the two materials is desirable.

FIGS. 7 and 8 illustrate a modular type of cell according to the present invention. The units 58 consist each of two elements 59 and 60, each of which comprises a rigid frame 59a and 60a, from the one side-wall of which there extends a separating wall 61a and 61b. The end sections of these are bent at right angles and form members 62a and 62b, respectively. The separation walls 61a/61b are connected with three inner surfaces of the frame, and in a preferred embodiment these form an integral part therewith. In the fourth wall a channel of flow 63 is left free. The separation walls 61a/61b and the elements 59 and 60 are adjusted in such manner that they surround a flowchannel over three surfaces of which, $F_1$, $F_2$ and $F_3$ there flows the brine. Into the dialysis compartment 64 there protrude a plurality of protrusions 70 and 71 which are in contact and which at least partially overlap. These may be of any suitable cross section. All components of 59 are made of anion-selective material, all those of 60 of cation-selective material. In the terminal sections there are provided the anode 66 and the cathode 67. The frame is advantageously made of a rigid polymeric substance such as those well known in the art. The cross sections and other sizes can be varied at will. Through the stack there flows the brine in the direction of arrows 69, the dialysate in direction of arrows 68.

The ion conductive elements of the present invention can be produced from any conventional ion exchange material. There may be used cationic exchange materials containing sulfo-groups, carboxy-groups or other anionic functional moieties; the anion exchange materials may be based on substituted and/or quaternized amino groups or on other cationic groups based on polyethylene, polyvinylchloride or other polymers which are suitably modified and/or substituted. As the water content and the selectivity of the ion-exchange members are not very critical, the said ion-exchange elements can be produced from comparatively inexpensive materials, having a comparatively high conductivity and good mechanical properties. The elements can be made by any of the conventional techniques, such as extrusion, weaving etc. Various electrodialysis stacks were set up according to the present invention and in all cases polarization was either decreased substantially or even eliminated entirely. In the following there are given results obtained with a small model in the laboratory which illustrates the beneficial effects of the present invention. The laboratory cell was of 10 cm$^2$ area, with a Selemion CMW (cation selective) and Selemion AMW (anion selective) membrane made by Asahi Glass Company Ltd., Japan. The dialysate space was filled with an ion-conductive element consisting of a fabric knit from fibers consisting of sulfonchlorinated polyethylene which was hydrolyzed and aminated, respectively, rendering them cation selective and anion selective, respectively. Spacers as follows were tried:

a. an anion exchange material (A) knit and a cation exchange material (C) knit touching each other, the fibers being of 0.3 mm diameter, each of these being in contact with the corresponding membrane. The entire thickness was about 3 mm.

b. interdigiting A and C fibers fastened to a nylon net, of a thickness of about 2 mm. Solutions of sodium chloride were subjected to electrodialysis. Desalination efficiency and resistance of the dialysate compartment, expressed as effective thickness calculated for a homogenous dialysate are summarized in the following Table.

TABLE

CURRENT EFFICIENCIES WITH SPACERS (a) and (b)

| i mA cm$^{-2}$ | $c_d$ g/lit | flow cm/sec | ηa % | ηb % | d$^a$ mm | d$^b$ mm |
|---|---|---|---|---|---|---|
| 31 | 1.92 | 11 | 87.5 | 91.3 | 3.2 | 1.9 |
| 23 | 1.92 | 11 | 78.3 | | | |
| 15.4 | 1.92 | 11 | | 87.2 | 3.1 | 1.9 |
| 31 | 1.92 | 2.2 | 82.8 | 91.7 | | |
| 6.2 | 1.92 | 2.2 | 86.7 | | | |
| 31 | 0.64 | 11 | 78.7 | 82.7 | 2.4 | 1.6 |
| 23 | 0.64 | 11 | 78.5 | 87.0 | | |
| 15.4 | 0.64 | 11 | 81.5 | 86.5 | 1.9 | 1.4 |
| 7.7 | 0.64 | 11 | | 90 | | |
| 6.2 | 0.64 | 11 | 80.3 | | | | i - current density
$c_d$ - concentration of dialysate in g/liter
η - current efficiency in percent
d - effective thickness of dialysate compartment
d$^a$ - effective thickness with spacer a
d$^b$ - effective thickness with spacer b Throughout the experiments the pH of the dialysate was stable.

The above Table proves that the stacks of the present invention have the following advantages over conventional electrodialysis stacks;

1. A high efficiency is maintained at low concentrations and at a high current density;
2. Ohmic resistance during prolonged desalination remains lower than that of a homogenous stream of dialysate of same thickness.

We claim:

1. An electrodialysis device comprising a plurality of adjacent compartments through which there flow dialysate and brine, respectively, each dialysate compartment being separated from the adjoining two compartments by an anion-selective and by a cation-selective membrane, respectively, the two terminal compartments being provided with an anode and a cathode, connected to a current source, wherein in the dialysate space between the membranes there are provided two continuous ion-conductive elements in contact with each other, said elements consisting of two different ion exchange materials, the anion-exchange material being in contact with the anion selective membrane, the cation-exchange material being in contact with the cation selective membrane, the electric resistance of said elements being lower than that of the dialysate, said elements providing a continuous path for the different ions across more than half of the distance between the membranes.

2. A device according to claim 1, wherein the elements are at least partially interdigiting or interwoven.

3. A device according to claim 1 wherein the ion-conductive elements constitute protrusions extending from the surfaces of the respective membranes.

4. A device according to claim 1, wherein the direction of flow of the dialysate and that of the brine are at right angles with each other.

5. A device according to claim 1, wherein the ion-conductive elements comprise fabrics consisting of fibers of the two different ion exchange materials.

6. A device according to claim 5, wherein the fabrics are knit or woven fabrics made of anion-exchange or cation exchange fibers or yarns.

7. A device according to claim 1, wherein the ion-conductive elements each comprise two ribbons of different ion-exchange material in contact with each other.

8. A device according to claim 1, wherein the ion-conductive elements comprise fibers or yarns supported by an inert permeable support member.

9. A device according to claim 1, wherein the dialysate flows through a continuous conduit defined by the compartments between brine-conducting members.

10. A device according to claim 9, wherein the brine-conducting member is in the form of a spiral.

11. A device according to claim 6, wherein the yarns comprise filaments of both anion-selective and cation selective materials.

12. A device according to claim 1, consisting of two interconnecting subunits of, each comprising a rigid frame wherein there is provided a separation wall across the said frame, leaving an open conduit for the brine and wherein two parallel separation walls define a shaft constituting the dialysate conduit, interdigiting protrusions of ion-exchange material being provided in said shaft.

* * * * *